(12) United States Patent
Duez et al.

(10) Patent No.: US 6,644,880 B2
(45) Date of Patent: Nov. 11, 2003

(54) WRITING ARTICLE WHOSE WRITING TIP INCLUDES A DRYING RETARDANT AND PROCESS FOR THE MANUFACTURE OF SUCH A TIP

(75) Inventors: José Duez, St. Martin Boulogne (FR); Vincent Bedhome, Desvres (FR)

(73) Assignee: Conte, Boulogne sur Mer Cedex (FR)

( * ) Notice: Subject to any disclaimer, the term of this patent is extended or adjusted under 35 U.S.C. 154(b) by 0 days.

(21) Appl. No.: 10/220,386

(22) PCT Filed: Feb. 28, 2001

(86) PCT No.: PCT/FR01/00575
§ 371 (c)(1),
(2), (4) Date: Oct. 3, 2002

(87) PCT Pub. No.: WO01/64453
PCT Pub. Date: Sep. 7, 2001

(65) Prior Publication Data
US 2003/0108377 A1 Jun. 12, 2003

(30) Foreign Application Priority Data
Mar. 2, 2000 (FR) .............................................. 00 02705
Dec. 19, 2000 (FR) .............................................. 00 16611

(51) Int. Cl.$^7$ ................................................. B43K 5/00
(52) U.S. Cl. ........................ 401/199; 401/198; 401/196
(58) Field of Search ................................. 401/199, 198, 401/196, 202, 207

(56) References Cited

U.S. PATENT DOCUMENTS

| | | | | |
|---|---|---|---|---|
| 3,111,702 A | | 11/1963 | Berger | |
| 4,136,076 A | * | 1/1979 | Daniels | ........................ 524/96 |
| 5,888,284 A | * | 3/1999 | Engel | ....................... 106/31.27 |

FOREIGN PATENT DOCUMENTS

| | | |
|---|---|---|
| EP | 0 344 379 | 12/1989 |
| EP | 0 516 538 | 12/1992 |
| FR | 2 684 602 | 6/1993 |

* cited by examiner

Primary Examiner—David J. Walczak
(74) Attorney, Agent, or Firm—Weingarten, Schurgin, Gagnebin & Lebovici LLP

(57) ABSTRACT

The invention concerns a writing implement (1) comprising ink (5) in a fibrous or non-fibrous reservoir, a retarding agent soluble or dispersible in the ink and a nib (7) for transferring ink (5) from the reservoir to the writing medium and a method for making such a nib (7). The invention is characterised in that a retarding agent is included in the writing nib (7) and is adapted to be carried by the ink (5) when it is transferred into said nib (7). The inventive method consists in impregnating an already machined writing nib with a solution containing a specific amount of a retarding agent, drying the impregnated writing nib, without stirring, by heating at a temperature less than 60° C.

28 Claims, 3 Drawing Sheets

Figure 1:
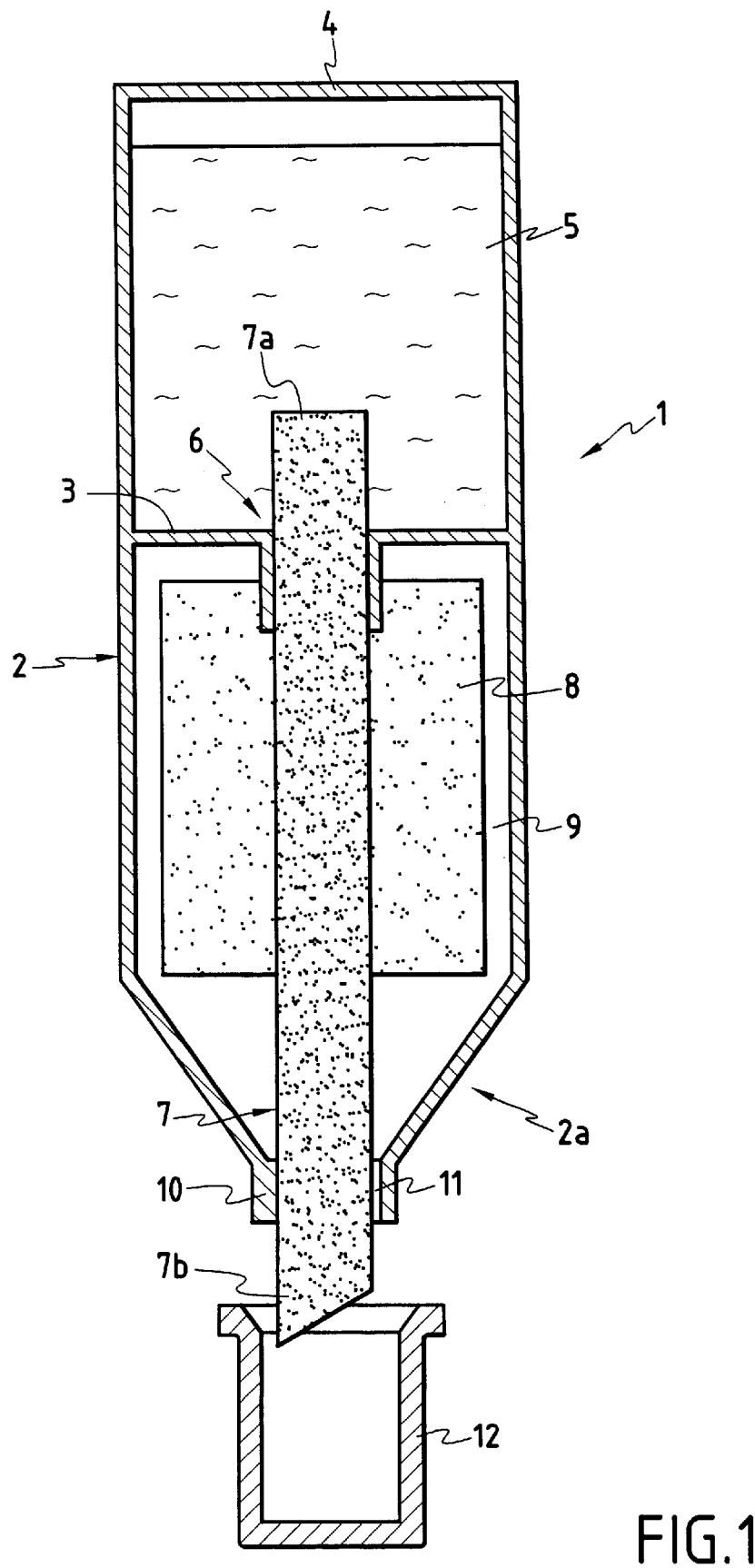

WRITING ARTICLE WHOSE WRITING TIP INCLUDES A DRYING RETARDANT AND PROCESS FOR THE MANUFACTURE OF SUCH A TIP

This invention concerns the field of writing articles, more particularly articles with a capillary writing tip which allows ink to be transferred from a reservoir, fibrous or otherwise, to the end of said tip which acts as a writing head.

The end of the writing tip, acting as a writing head, necessarily protrudes with respect to the body of the article which the user holds when writing. The ink used up on the writing medium is replaced by ink from the reservoir and transferred by capillary action to the writing tip. When the article is not used, a cap is screwed onto the body of the article such that it covers the writing tip in order to protect it against impact and to prevent it drying out. If the protruding end of the writing tip is left exposed to air, the ink solvent evaporates while the various constituents contained in the ink remain there. As a result of this, the writing tip can become clogged by ink constituents, causing problems when the article is reused, and may even render reuse impossible because of the insolubility of the constituents having caused clogging in the ink solvent, and this even if a substantial amount of ink remains in the reservoir.

To avoid this problem, manufacturers of writing articles attempt to increase the "cap-off time", a term used to describe the length of time a writing article can be left with the cap off the tip without this leading to problems when the article is reused.

One solution has already been proposed. This consists in modifying the composition of the ink by adding an additive to delay drying, notably of the film-forming type. When the writing tip, saturated with ink, is exposed to air for a long period of time, the ink solvent evaporates and a skin or film forms over the surface of said tip as a result of the presence of this additive. This skin or film has very low mechanical resistance such that it is eliminated once the user applies the writing tip to the writing medium.

This solution substantially improves the length of time the tip can be left exposed to air. However, its application is somewhat problematic. The tip-drying phenomenon is, in fact, very important for articles where an alcohol-based solvent is used in the ink. Suitable film-forming substances are either not very soluble or not very dispersible in these solvents, such that when the article is assembled, it is generally necessary to heat the ink in order to dissolve or disperse the additive in an adequate manner.

The purpose of this application is therefore to propose a writing article which circumvents the aforesaid disadvantage by significantly increasing the length of time the writing tip can be exposed to air, without this having a negative effect on use of the article and without the need to alter the composition of the ink and/or usual operating conditions for assembling the article.

This objective is completely attained by the writing article of the invention which consists of ink in a reservoir, fibrous or otherwise, a drying retardant soluble or dispersible in the ink and a writing tip capable of transferring ink from the reservoir to the writing medium. Characteristically, a drying retardant is included in the writing tip and is carried along by the ink in the course of the latter's transfer through said tip. The term "drying retardant" as used in this application is not limited to a single agent as it also covers a mixture of several drying retardants.

When ink is being transferred to the writing tip, the drying retardant in the writing tip is carried along by the ink such that when said ink reaches the end of the tip acting as a writing head, the ink contains a sufficient amount of retardant to form, in the event of drying out by evaporation of the ink solvent, a skin or film at the surface of said writing tip, thus limiting further evaporation.

Preferably, the amount of drying retardant included in the writing tip depends on the ink's capacity to carry along said retardant, on the amount of ink in the reservoir and, possibly, the amount of drying retardant in the ink such that some drying retardant remains in the writing tip when the reservoir is empty. The aim of this is to obtain the desired result for the duration of the writing article's functional life. The ink contained in the reservoir can be completely devoid of drying retardant or it could contain a small amount of retardant, depending on the solubility of this retardant in the ink solvent at room temperature. The need to heat the ink during production of the article is thus avoided. Advantageously, this also avoids the need to incorporate too much retardant and makes it possible to use different retardants, for example a retardant that can be dispersed in the ink solvent in the ink reservoir or a retardant soluble in said solvent in the writing tip.

The choice of drying retardant is evidently dependent on the type of solvent used for the ink. Some agents are only compatible with water-based inks while others are only compatible with alcohol-based inks, and yet others are compatible with both types of solvent. An ink is called "water-based" (or alcohol based) when water (or alcohol) is the principal solvent, which does not exclude the use of smaller amounts of other solvents.

Drying retardants compatible with water-based inks include: N-phenyiurea, N-ethylurea, thiourea, ethylene thiourea, diethyleneglycol, propyleneglycol, polypropyleneglycol, a mixture of propylene glycol and polyglycol, sorbitol and glycerine.

Drying retardants compatible with inks based on alcohol solvents include: paraffin wax, carnauba wax, polyethylene wax, ethylene glycol, cetyl stearate, cetyl palmitate, stearyl stearate, Myristile myristate and, preferably, sorbitan esters (sorbitan monostearate).

Drying retardants compatible with both water-based and alcohol-based inks include beeswax and carnauba wax.

Another aim of the invention is to propose a process for the manufacture of the above-described writing article. This process consists of the following steps:

a) Continuous impregnation of a cylindrical element with high capillarity in a bath containing a specific amount of drying retardant such that uniform distribution in the transverse section of the element is obtained, b) Drying the impregnated cylindrical element, c) Sawing and machining.

Preferably, the bath consists of a concentrated solution of the drying retardant whereas the ink used in the writing article is an ink based on a solvent in which the drying retardant is only slightly soluble. It is thus possible, by using a concentrated impregnation bath, to incorporate a large amount of drying retardant in the cylindrical element which forms the writing tip. In the course of ink transfer in the writing tip, the ink carries along only a small amount of the drying retardant, as a function of the limit of solubility of this agent in the ink solvent.

In some cases, a high concentration of the drying retardant can increase the viscosity of the impregnation bath to such a degree that diffusion of the bath into the cylindrical element is particularly slow, if not limited, and it becomes difficult, under industrial conditions, to obtain uniform distribution of the bath throughout the transverse section of said element. If this is the case, the process according to the invention allows for a less concentrated bath to be used and the impregnation (a) and drying (b) steps are carried out until the desired amount of drying retardant is incorporated into the cylindrical element.

In a preferred embodiment, the drying agent incorporated into the writing tip is situated mainly at the edges of said tip. It has in fact been found that it is possible, in some cases, to considerably reduce the total amount of drying retardant used and still obtain the same efficacy.

A process is proposed for the manufacture of a writing tip which is specially designed to such that the drying retardant accumulates at the edges. This process consists of the following steps:

a) Impregnation of a previously machined writing tip in an impregnation bath containing a specific amount of a drying retardant and b) Drying the writing tip, with stirring, by heating to a temperature below or equal to 60° C.

Carrying out impregnation of a previously machined writing tip has two advantages. Firstly, there is no risk of the machining equipment becoming clogged, particularly the moulds, which can occur when the cylindrical element, which already contains the drying retardant, is sawn and worked. Secondly, the loss of drying retardant because of the machining process can be reduced.

Even if the drying retardant has, at the end of impregnation in the bath, uniformly diffused throughout the writing tip, it is found that drying at moderate temperatures, notably below 60° C., leads to diffusion of the impregnation bath, including the drying retardant, towards the edges of the writing tip. To prevent non-uniform distribution at the edges as a result of contact between the writing tips during drying, the writing tips must be stirred while the drying process is carried out.

This concentration of drying retardant at the edges of the writing tip means the efficacy of ink carried along by said retardant can be increased. This is what makes it possible to use an impregnation bath with a much lower concentration in drying retardant, from 0.05% to 2%, compared to the first method described above. In a preferred embodiment, the impregnation bath consisting of a water/alcohol (50/50) mixture contains 0.1 to 0.5% by weight of sorbitan ester.

It has also been noted that when the drying retardant is solid at room temperature, it is preferable to heat the impregnation bath to a sufficient temperature to obtain a clear solution, which allows good impregnation by the bath without the need for filtration. For example, the bath temperature in the case of sorbitan ester was in the order of 35° C. and above.

Figure 2:
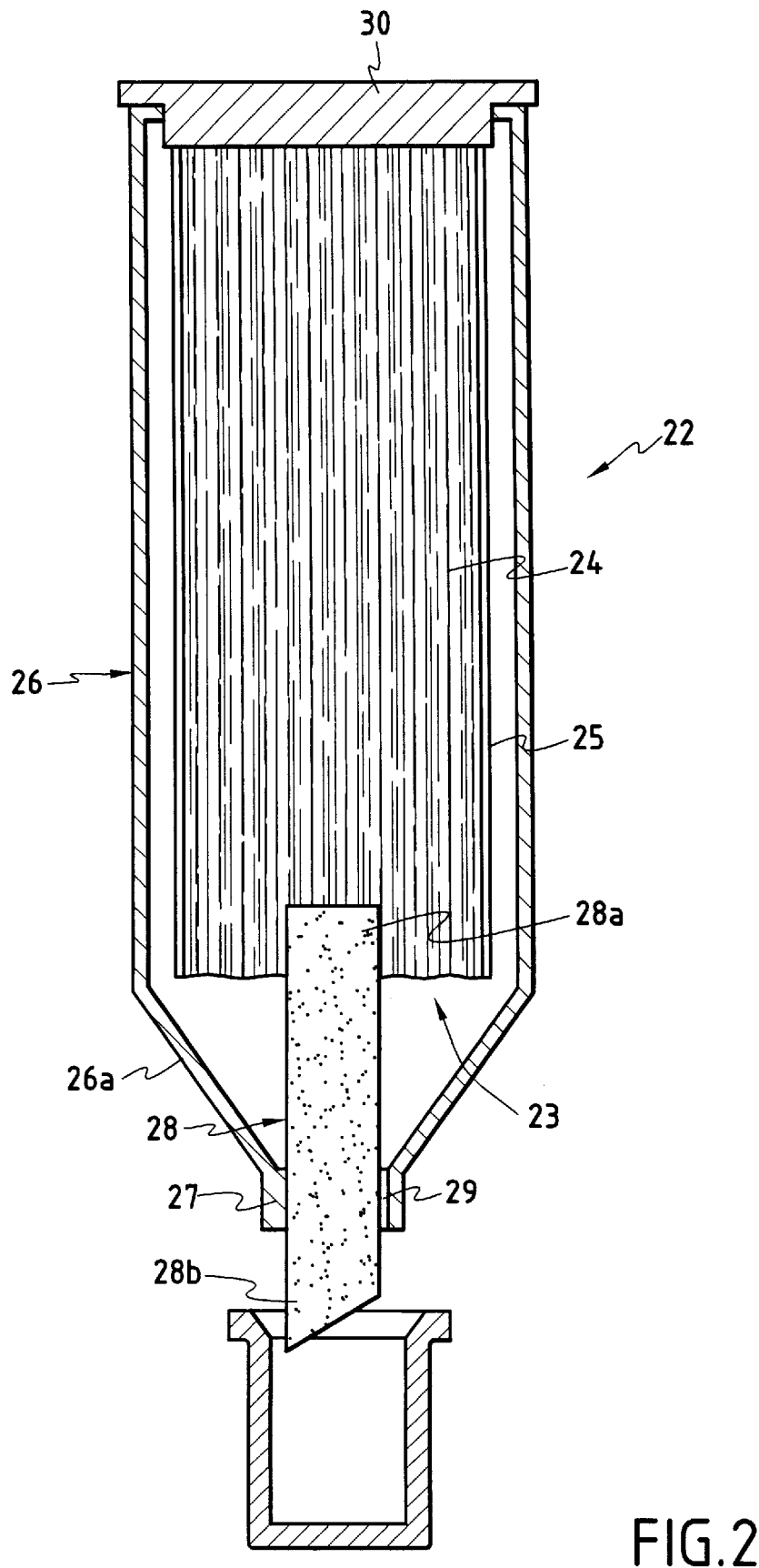

This invention will become clearer on reading the description below of the writing article whose tip includes a drying retardant and process for the manufacture of such a writing tip, illustrated by the drawing wherein FIGS. 1 and 2 are diagrammatic representations of two cuts of examples of the writing article.

Figure 3:
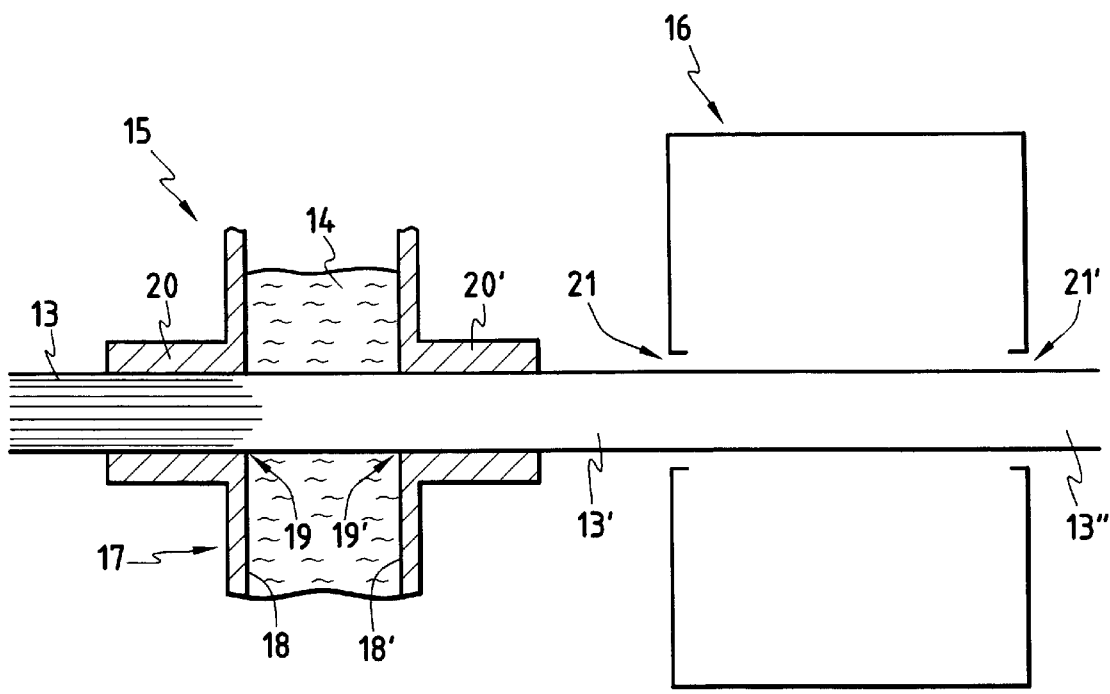

FIG. 3 is a diagrammatic representation of several steps in the writing-tip manufacturing process.

The first example of a writing article 1, illustrated in FIG. 1, consists of a body 2 which is generally cylindrical in shape with an internal partition 3 which delimits a reservoir 4 for liquid ink 5 towards the back. This partition 3 is perforated by an opening 6 which is stoppered by a writing tip 7 whose back ends 7a opens into the reservoir 4 and whose front end 7b opens into the body 2 of the article 1 and forms the writing head of said article. In the illustrated example, the article 1 also includes a buffer reservoir 8 which is positioned in the front compartment 9 of the body 2 around the tip 7. This buffer reservoir, in contact with the tip 7, is used to temporarily absorb any excess ink that might be transferred to the tip 7 in the event of changes in the conditions of use of article 1, notably in the case of an increase in air temperature in the reservoir. The ink absorbed by the buffer reservoir 8 is then reconstituted at the tip 7 when conditions return to normal. Such a writing article 1 is described in document EP.518.538.

The end 7b of the tip 7, which acts as a writing head, protrudes with respect to the front part 2a of the body 2 of article 1. In the illustrated example, this front part has a generally truncated shape and ends with a cylindrical nozzle 10 with a central groove to allow the end 7b of the tip 7 to pass through it and a lateral opening 11 for circulation of air from the exterior to the interior of compartment 9.

The article 1 is also equipped with a cap 12 which screws onto the nozzle to make the writing head of the article airtight. This cap 12 plays a dual role: it protects the writing head 7b against impact and prevents the ink contained in said writing head from drying out, a phenomenon which could be damaging if it leads to blocking of the head 7b by constituents of the ink 5.

In order to avoid the risk of clogging, it is customary to add a drying retardant to the ink 5 to increase the length of time the writing head 7b can be left exposed without protection by the cap 12, without this having a negative effect on later use of the article 1. This period of time is commonly known as "cap-off time". The liquid ink 5, either dissolved or dispersed in said drying retardant, diffuses into the porous and capillary structure of tip 7 all the way to the writing tip 7b which protrudes with respect to the nozzle 10 of the body 2. If the head 7b is left exposed to air for a prolonged period of time, the ink solvent at the edges of the head 7b evaporates. During evaporation, the retardant, which remains in place, forms a skin or film at the interface between external air and the solvent. This skin or film considerably limits solvent evaporation, effectively increasing the cap-off time. It has very low mechanical resistance such that it is easily removed by rubbing it against the writing medium the next time the article 1 is used.

According to another feature of the invention, a drying retardant is incorporated into the writing tip 7 such that the ink 5 is saturated with the agent contained in the writing tip during its transfer from the reservoir 4 to the writing head 7b. Formation of a skin or film at the writing head 7b to improve cap-off time is identical to what was described above.

In the prior art, operating conditions for the manufacture of the article were particularly delicate because the preparation of ink containing a drying retardant meant that the process had to be carried out under conditions at the limits of solubility or dispersion, and frequently with the ink being dried during assembly of the article. With this invention, these problems are no longer an issue as the ink is free of retardant or contains an amount of retardant below the limit of solubility or dispersion at room temperature.

It is understood that the retardant is incorporated into the writing tip so that it can be carried along by the ink which diffuses into said tip by capillary action as long as a number of conditions are met. The first condition is that retardant concentration in the ink which arrives at the writing head 7b must be sufficient for it to form a skin or film once the solvent evaporates. The second condition is that the retardant must be present in a sufficiently small amount for the desired effect to last as long as the article does, in other words as long as liquid ink 5 remains in the reservoir 4.

In order to obtain a substantial amount of retardant incorporated into the tip 7, a manufacturing process is applied which consists in continuously impregnating a cylindrical element, for example an acrylic fibre shaft 13, in an impregnation bath 14 with a high retardant concentration, then in drying the impregnated shaft 13' before working it to form the writing tip 7.

FIG. 3 is a highly diagrammatic representation of the impregnation and drying stages carried out in succession along the shaft 13 by means of an impregnation head 14 and a drying oven 16. Any type of drying method can be used, such as conduction, convention or microwaving.

The impregnation head 15 consists of a reservoir 17 containing the impregnation bath 14. The two facing vertical sides 18 and 18' of the reservoir are perforated by two openings 19 and 19' positioned to fit exactly over the transverse section of shaft 13. Each opening 19, 19' is extended towards the outside by a support 20, 20', which is ring-shaped when the transverse section of the shaft is circular.

Application of the process consists in inserting the shaft 13 through the support 20, 20' and the openings 19, 19' of the impregnation head 15 and through the openings 21, 21' of the drying oven 16.

The shaft is continuously pulled through the impregnation head 15 and the drying oven 16. The diameter of openings 19, 19' and supports 20, 20' is adjusted to fit the transverse section of the shaft 13 such that the shaft 13, along with the internal sides of the supports 20, 20', form a sealed joint preventing any direct release of the impregnation bath 14.

In the course of continuous displacement of the shaft 13 through the impregnation head 15, the impregnation bath 14 diffuses naturally towards the capillary pores of shaft 13. This diffusion takes place in such a way that at the inlet opening 21 of the drying oven 16, the impregnation bath 14 diffuses throughout the transverse section of the impregnated shaft 13.

After passing through the oven 16, the solvent in the impregnation bath 14 is eliminated such that the retardant is now incorporated in a uniform manner throughout the transverse section of the shaft 13" leaving the oven 16. The shaft 13" is then sawn and worked to form the writing tip 7.

Given that the aim is to incorporate a substantial amount of drying retardant in the writing tip in order to obtain the desired effect for the duration of the article's life, it is desirable to use an impregnation bath which is concentrated, and possibly very concentrated, in drying retardant. Nevertheless, increasing the concentration can, under the above-mentioned conditions, prevent diffusion of said bath as a result of corresponding increase in the bath's viscosity. It is therefore necessary to establish a suitable drying retardant concentration in the bath in order to obtain diffusion throughout the transverse section of the shaft on arrival in the oven, otherwise several successive impregnation and drying steps have to be carried out to obtain the desired amount of retardant to be incorporated into the element which, after sawing and machining, makes up the writing tip.

The solvent in the impregnation bath is selected such that the above-mentioned appropriate concentration is as high as possible. On the other hand, the retardant must have limited and controlled solubility in the ink solvent. These conditions result in a high retardant concentration in the writing tip and a limited and continuous supply of said agent from ink diffusing through the writing tip when the article is used.

Drying retardants corresponding to this preferred variant include the following compounds: cetyl stearate, cetyl palmitate, stearyl stearate, Myristile myristate and, preferably, sorbitan ester.

An example of an ink composition and an impregnation bath composition based on sorbitan ester (sorbitan monostearate) are given below as a non-limiting illustration of the invention:

| Ink composition: | |
|---|---|
| ethyl alcohol | 90% |
| basic dyes | 5% |
| resin (polyvinyl resin) | 5% |
| Impregnation bath composition: | |
| water/alcohol mixture (50/50) | 95% |
| sorbitan ester | 5% |

The writing article 22, which is illustrated in FIG. 2, differs from the first example in that the ink is not actually in the liquid state in the reservoir but rather enclosed in a fibrous reservoir 23. This type of fibrous reservoir is well known. It generally consists of a fibre bundle 24 in a generally longitudinal direction such that the interstices between the various fibres form capillaries which both collect and transfer the ink. This fibre bundle 24 is surrounded by a case 25, generally a plastic film. The cylindrical body 26 of the article 22 is stoppered by a cap 30 at the back. The front part 26a of the body 26 is generally trunk-shaped and ends with a cylindrical nozzle 27 with a central groove to allow the end 28b of the writing tip 28 to pass through it and an opening 29 for circulation of air from the exterior to the interior of the body 26. The fibrous reservoir 23 takes up almost the entire internal volume of the cylindrical part of the body 26. The back part 28a of the writing tip 28 penetrates the interior of the fibre bundle 24. It is therefore the fibrous reservoir 23 which supplies the writing tip 28 with ink, said ink carrying along, as in the first example, the drying retardant incorporated into said writing tip 28 to the front part 28b of the tip which constitutes the writing head.

In the preceding example, impregnation of the shaft 13 by the bath 14 is carried out such that it is uniform throughout the shaft section, and also, after drying, sawing and machining, throughout the writing tip. In the second example, described below, the retardant accumulates mainly at the edges of the writing tip, as well as in the areas subjected to machining. Concentrating the drying retardant increases the efficacy of the desired aspect, in other words cap-off time. It is probable that concentrating the drying retardant at the edges creates a network of skin or fibres, during evaporation of the solvent, which seals the capillary network of the writing tip much more effectively.

Furthermore, this localised concentration at the edges makes it possible to use a much lower amount of drying retardant for the same result.

In order to carry out localised concentration of the retardant in the writing tip, a discontinuous process, rather than a continuous process as described previously, is applied and involves previously sawn and machined writing tips. This process consists in plunging the previously machined writing tips into an impregnation bath containing a given amount of drying retardant, then drying said impregnated tips using conventional methods at a moderate temperature, notably 60° C., with stirring, to obtain gradual diffusion of all the bath impregnating the writing tip towards the exterior and thus concentrating the retardant carried along by diffusion at the edges of said tip. This concentration is observed when a transverse cut of the tip is made after adding a coloured marker bound to the drying retardant. It is noted that the marker is distributed in a ring-like fashion in this section. This demonstrates that the drying retardant is concentrated at the edges of the tip; in other words, over an area which can be a few tenths of a millimetre thick with respect to the external surface of the tip. On the other hand, if microwave type drying is applied, extremely uniform distribution of the marker is found throughout the tip section.

Using the same example of an ink composition given above, we applied the following composition as an impregnation bath:

| | |
|---|---|
| water/alcohol mixture (50/50) | 99.7% |
| sorbitan ester | 0.3% |

Thus, in spite of using a sorbitan ester impregnation bath that is 25 times less concentrated, a similar, if not longer, cap-off time was obtained.

It can also be seen that as sorbitan ester solid at room temperature, the impregnation bath was heated to a temperature of about 35° C. so as to obtain a perfectly clear bath and thus perfect impregnation of the writing tips by the bath, without the need to filter said bath.

What is claimed is:

1. Writing article comprised of ink in a reservoir, fibrous or otherwise, a drying retardant soluble or dispersible in the ink and a writing tip capable of transferring ink from the reservoir to the writing medium, wherein said drying retardant is incorporated into the writing tip and is able to be carried along by the ink during its transfer through said tip.

2. Writing article according to claim 1 wherein the amount of drying retardant incorporated into the writing tip depends on the capacity of the ink to carry along said agent, the amount of ink in the reservoir and the amount of drying retardant in the writing tip when the reservoir is empty of ink.

3. Writing article according to claim 2 wherein the drying retardant, notably one compatible with water-based inks, is chosen from the group comprised of N-phenylurea, N-ethylurea, thiourea, diethyleneglycol, propyleneglycol, polypropyleneglycol, a mixture of propylene glycol and polyglycol, sorbitol and glycerine.

4. Writing article according to claim 2 wherein the drying retardant, notably one compatible with alcohol-based inks, is chosen from the group comprised of paraffin wax, polyethylene wax, ethylene glycol, cetyl stearate, cetyl palmitate, stearyl stearate, Myristile myristate and, preferably, sorbitan ester.

5. Writing article according to claim 2 wherein the drying retardant, notably one compatible with both water-based and alcohol-based inks, is chosen from the group comprised of beeswax and carnauba wax.

6. Writing article according to claim 2 wherein the drying retardant incorporated into the writing tip accumulates mainly at the edge of the tip.

7. Process for the manufacture of a writing tip, for use in the article of claim 6, comprising the following steps:
 a) Impregnation of a previously machined writing tip in an impregnation bath containing a specific amount of a drying retardant,
 b) Drying the writing tip saturated in this way, with stirring, by heating to a temperature below or equal to 60° C.

8. Writing article according to claim 1 wherein the drying retardant, notably one compatible with water-based inks, is chosen from the group comprised of N-phenylurea, N-ethylurea, thiourea, diethyleneglycol, propyleneglycol, polypropyleneglycol, a mixture of propylene glycol and polyglycol, sorbitol and glycerine.

9. Writing article according to claim 8 wherein the drying retardant incorporated into the writing tip accumulates mainly at the edge of the tip.

10. Process for the manufacture of a writing tip, for use in the article of claim 9, comprising the following steps:
 a) Impregnation of a previously machined writing tip in an impregnation bath containing a specific amount of a drying retardant,
 b) Drying the writing tip saturated in this way, with stirring, by heating to a temperature below or equal to 60° C.

11. Writing article according to claim 1 wherein the drying retardant, notably one compatible with alcohol-based inks, is chosen from the group comprised of paraffin wax, polyethylene wax, ethylene glycol, cetyl stearate, cetyl palmitate, stearyl stearate, Myristile myristate and, preferably, sorbitan ester.

12. Writing article according to claim 11 wherein the drying retardant incorporated into the writing tip accumulates mainly at the edge of the tip.

13. Process for the manufacture of a writing tip, for use in the article of claim 12, comprising the following steps:
 a) Impregnation of a previously machined writing tip in an impregnation bath containing a specific amount of a drying retardant,
 b) Drying the writing tip saturated in this way, with stirring, by heating to a temperature below or equal to 60° C.

14. Writing article according to claim 1 wherein the drying retardant, notably one compatible with both water-based and alcohol-based inks, is chosen from the group comprised of beeswax and carnauba wax.

15. Writing article according to claim 14 wherein the drying retardant incorporated into the writing tip accumulates mainly at the edge of the tip.

16. Process for the manufacture of a writing tip, for use in the article of claim 15, comprising the following steps:
 a) Impregnation of a previously machined writing tip in an impregnation bath containing a specific amount of a drying retardant,
 b) Drying the writing tip saturated in this way, with stirring, by heating to a temperature below or equal to 60° C.

17. Process for the manufacture of a writing tip, specially designed to be used in the writing article according to claim 1, comprising the following steps:
 a) Continuous impregnation of a cylindrical element with high capillarity in a bath containing a specific amount of drying retardant such that uniform distribution in the transverse section of the element of said bath is obtained,
 b) Drying the impregnated cylindrical element,
 c) Sawing and machining.

18. Process according to claim 17 wherein the impregnation bath consists of a concentrated solution of the drying retardant whereas the ink used in the writing article is an ink based on a solvent in which the drying retardant is only slightly soluble.

19. Process according to claim 18 wherein the process consists of several successive impregnation and drying steps carried out to obtain the desired amount of retardant in the cylindrical element which, before sawing and machining, is greater than the given amount.

20. Process according to claim 17 wherein the process consists of several successive impregnation and drying steps carried out to obtain the desired amount of retardant in the cylindrical element which, before sawing and machining, is greater than the given amount.

21. Writing article according to claim 1 wherein the drying retardant incorporated into the writing tip accumulates mainly at the edge of the tip.

22. Process for the manufacture of a writing tip, for use in the article of claim 21, comprising the following steps:
   a) Impregnation of a previously machined writing tip in an impregnation bath containing a specific amount of a drying retardant,
   b) Drying the writing tip saturated in this way, with stirring, by heating to a temperature below or equal to 60° C.

23. Process according to claim 22 wherein the impregnation bath contains between 0.05 and 2% by weight of drying retardant.

24. Process according to claim 23 wherein, the drying retardant is solid at room temperature, the temperature of the impregnation bath is sufficient to obtain a clear solution, without the need for filtration.

25. Process according to claim 23 wherein the impregnation bath contains from 0.1 to 0.5% of sorbitan ester.

26. Process according to claim 25 wherein, the drying retardant is solid at room temperature, the temperature of the impregnation bath is sufficient to obtain a clear solution, without the need for filtration.

27. Process according to claim 26 wherein, the drying retardant is sorbitan ester, and the temperature of the impregnation bath is in the region of 35° C.

28. Process according to claim 22 wherein, the drying retardant is solid at room temperature, the temperature of the impregnation bath is sufficient to obtain a clear solution, without the need for filtration.

* * * * *

UNITED STATES PATENT AND TRADEMARK OFFICE
CERTIFICATE OF CORRECTION

PATENT NO.    : 6,644,880 B2
DATED         : November 11, 2003
INVENTOR(S)   : José Duez et al.

It is certified that error appears in the above-identified patent and that said Letters Patent is hereby corrected as shown below:

Column 2,
Line 32, "N-phenyiurea" should read -- N-phenylurea --.

Signed and Sealed this

Sixth Day of July, 2004

JON W. DUDAS
*Acting Director of the United States Patent and Trademark Office*